(12) United States Patent
Rogg

(10) Patent No.: US 7,669,684 B2
(45) Date of Patent: Mar. 2, 2010

(54) STEERING DRIVE FOR A STEERED WHEEL OF AN INDUSTRIAL TRUCK, PARTICULARLY A REAR WHEEL OF A THREE-WHEELED INDUSTRIAL TRUCK

(75) Inventor: Andreas Rogg, Lubeck (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 179 days.

(21) Appl. No.: 11/755,958

(22) Filed: May 31, 2007

(65) Prior Publication Data
US 2008/0004148 A1 Jan. 3, 2008

(30) Foreign Application Priority Data
Jun. 13, 2006 (DE) ........................ 10 2006 027 369

(51) Int. Cl.
  *B60K 17/30* (2006.01)
  *B60K 17/356* (2006.01)
(52) U.S. Cl. ..................... 180/264; 180/65.5; 180/65.6; 180/411; 180/267; 180/265
(58) Field of Classification Search ................ 180/65.5, 180/65.6, 411, 264, 267, 265
  See application file for complete search history.

(56) References Cited

U.S. PATENT DOCUMENTS

| 5,685,798 | A | * | 11/1997 | Lutz et al. .................... 475/331 |
| 6,145,611 | A | * | 11/2000 | Haddad, Sr. .................. 180/12 |
| 6,367,571 | B1 | * | 4/2002 | Schwarz ...................... 180/253 |
| 6,688,416 | B2 | * | 2/2004 | Higaki et al. ................ 180/253 |
| 6,722,459 | B1 | * | 4/2004 | Wendl et al. ................ 180/65.5 |
| 6,852,061 | B2 | * | 2/2005 | Schoon ........................ 475/348 |
| 6,974,399 | B2 | * | 12/2005 | Lo .................................. 475/5 |
| 7,147,073 | B2 | * | 12/2006 | Mollhagen ................. 180/65.5 |
| 7,245,052 | B2 | * | 7/2007 | Stubner ....................... 310/77 |
| 7,404,676 | B2 | * | 7/2008 | Stubner ....................... 384/539 |
| 2006/0113853 | A1 | * | 6/2006 | Stubner ....................... 310/83 |
| 2007/0267234 | A1 | | 11/2007 | Rogg |

FOREIGN PATENT DOCUMENTS

| DE | 199 11 458 A1 | 10/1999 |
| DE | 101 13 775 A1 | 9/2002 |
| EP | 1 857 317 A1 | 4/2007 |
| EP | 1 808 323 A2 | 12/2007 |

* cited by examiner

*Primary Examiner*—Lesley Morris
*Assistant Examiner*—Marlon A Arce
(74) *Attorney, Agent, or Firm*—Vidas, Arrett & Steinkraus, P.A.

(57) ABSTRACT

A steering drive for a steeled wheel of an industrial truck, particularly a rear wheel of a three-wheeled industrial truck, comprising a steering bolster supporting the rear wheel which is supported to be pivotable about a vertical steering axle inside the flame of the industrial truck, a steeling motor coaxial with the steering axle, a bearing assembly between the flame of the industrial truck and the bolster, and a steering transmission between the steering motor and bolster, wherein the steering transmission has a single-stage or multi-stage stepped planetary mechanism or planetary coupler mechanism which is coaxial with the steering axle and the bearing assembly for the bolster is arranged within the steering transmission.

13 Claims, 4 Drawing Sheets

STEERING DRIVE FOR A STEERED WHEEL OF AN INDUSTRIAL TRUCK, PARTICULARLY A REAR WHEEL OF A THREE-WHEELED INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Electrically driven counterweight-type trucks including a three-wheeled chassis mostly have a steered, non-driven rear wheel. The real wheel mostly is designed as a twin wheel and is rotatably mounted on the vehicle frame by means of a body bolster. The steering motion is transferred to the rotary bolster by means of a steering rack or transmission.

From DE 101 13 775 A1, the entire contents of which is incorporated herein by reference, a steering transmission has become known where the steering motor acts on the steering bolster via an eccentric drive. The steering bolster is supported on the vehicle frame by means of a four-point support.

It is the object of the invention to provide a steering drive for a steered wheel of a three-wheeled industrial truck which exhibits an improved efficiency for the steering transmission, allows for a smaller construction size of the steering motor and steering transmission, and reduces the effort for a support of the steeling bolster.

BRIEF SUMMARY OF THE INVENTION

In the inventive steering drive, the steering transmission has a single-stage or multi-stage stepped planetary mechanism or planetary couplet mechanism which is coaxial with the steering axle and the bearing assembly for the bolster is arranged within the steering transmission.

The stepped planetary mechanism or planetary coupler mechanism may be preceded by another planetary transmission.

The inventive steering transmission allows for an improved efficiency. Both the steering motor and steering transmission exhibit a smaller construction size. The arrangement of the steering bolster bearing inside the planetary transmission allows using less expensive bearings. The formation of assembly units for the steering bolster and steering drive makes possible a reduction of assembly efforts.

An aspect of the invention provides that the inner race of at least one antifriction bearing is supported on a central bearing component coupled to the bolster while the outer race is supported on a transmission case portion. It is preferred to provide two axially-spaced antifriction bearings, which preferably are tapered roller bearings.

If a planetary coupler mechanism is provided the bearing component also serves as a planet pinion carrier, the driven wheel of the transmission being defined by an internal gear provided on the bolster. According to another aspect of the invention, the internal gear may be formed integrally with the bolster.

According to another aspect of the invention, the motor case portion and disc-like transmission case portions stacked on top of each other define a closed drive case. The bolster may have disposed thereon a contacting gasket which sealingly interacts with a sealing surface of the case portion facing it. This protects the entire steering drive unit from dirt, moisture, etc.

Further advantageous aspects of the invention are set forth in further dependent claims.

The drive case may have disposed therein sensors and assembly units for the control of the steering motor.

BRIEF DESCRIPTION OF THE DRAWINGS

Embodiments of the invention will be described in detail below with reference to the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
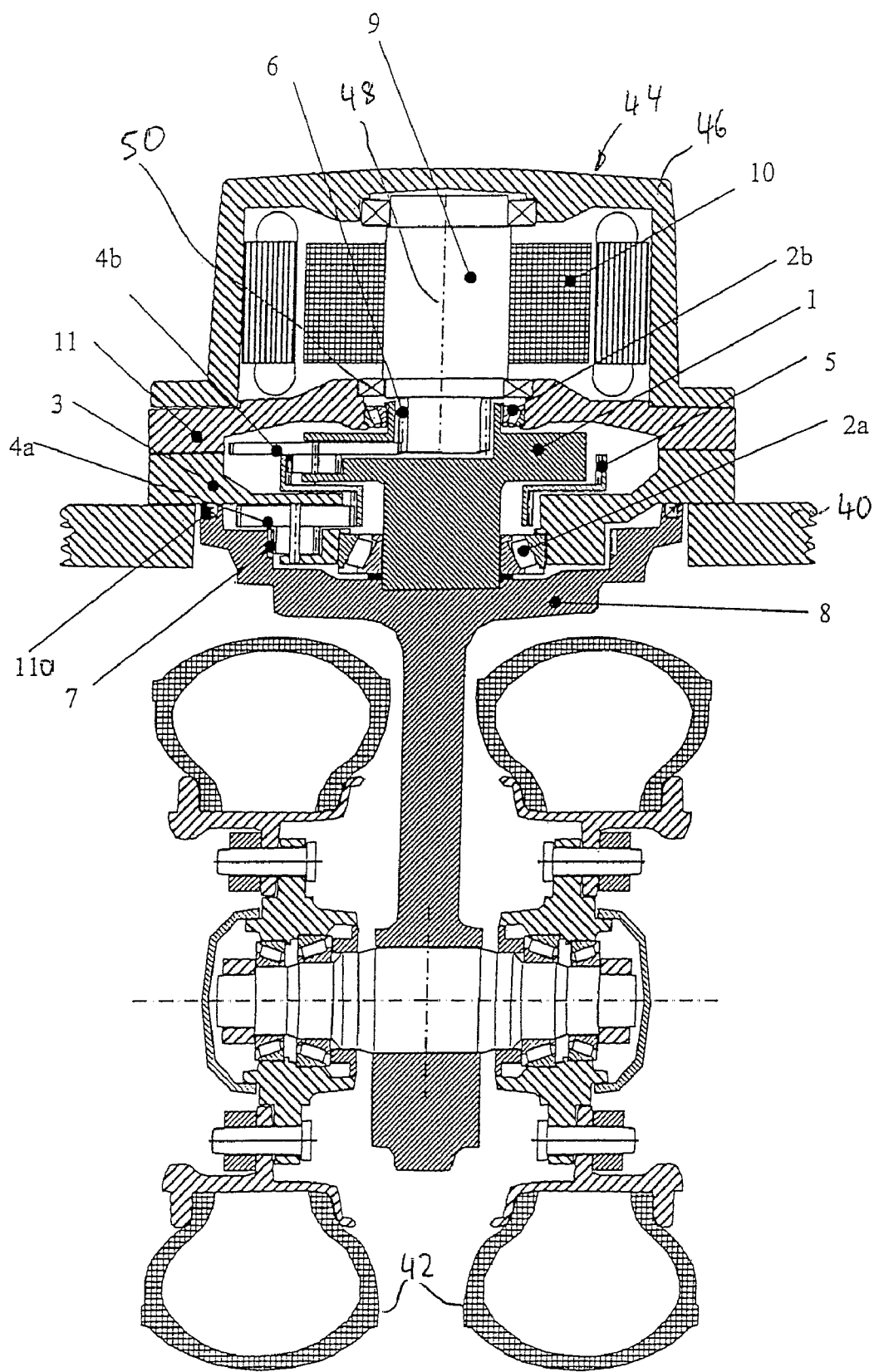
FIG. 1 shows a section through a first embodiment of a steering drive according to the invention which has a planetary coupler mechanism.

Referring to FIG. 1, a frame of an industrial truck is outlined at 40 where the three-wheeled industrial truck has a steered, non-driven rear wheel. In FIG. 1, the rear wheel is a so-called twin wheel 42 which is supported by a steering bolster 8. A drive case generally designated 44 is composed of a cup-like motor case portion 46 and two disc-like superimposed transmission case portions 11, 3 with the latter being attached to the frame 40, which is not shown, however. The steering bolster 8 is of a shell-like shape in the upper portion where a contacting gasket 11a is accommodated in the border and interacts with a level lower surface of the case portion 3 that faces it in order to prevent dust and moisture from entering the drive case 44.

An electric motor 10 with a motor shaft 9, which has an axle 48, is located inside the motor case portion 46. A pinion 6 is disposed on the motor shaft 9 or is formed integrally therewith. The motor shaft 9 and steering bolster 8 are coaxial. The motor shaft 9 is supported by the case portion 11 by means of an antifriction bearing 50.

A planetary coupler mechanism is arranged within the transmission case and has stepped planetary gears 4a and 4b which are coupled to each other via a coupler shaft 5. Firmly connected coaxially to the steering bolster 8 is a bearing component 1 which also is a planet pinion carrier for the stepped planetary gears 4b. The planet carrier for the stepped planetary gears 4a is constituted by the transmission case portion 3. The lower step of the stepped planetary gears 4a interacts with a tooth system 7 of an internal gear which is defined by the steering bolster 8. The pinion 6 interacts with the larger stage of the stepped planetary gears 4b while the smaller stage interacts with the coupler shaft 5. Hence, the output of the steering transmission is defined by the bearing component 1 attached to the steering bolster (planet carrier), on one hand, and the internal gear coupled to the steering bolster 8, on the other.

In the representation of FIG. 1, two tapered roller bearings 2a, 2b further can be recognized which are axially spaced and the inner rings of which are supported each on the bearing component 1 (planet carrier). The outer ring of the lower tapered roller bearing 2a is supported on the transmission case portion 3 and the outer ring of the upper tapered roller bearing 2b is supported on the transmission case portion 11. Thus, the bearing of the steering bolster 8 is within the steering transmission shown.

Figure 2:
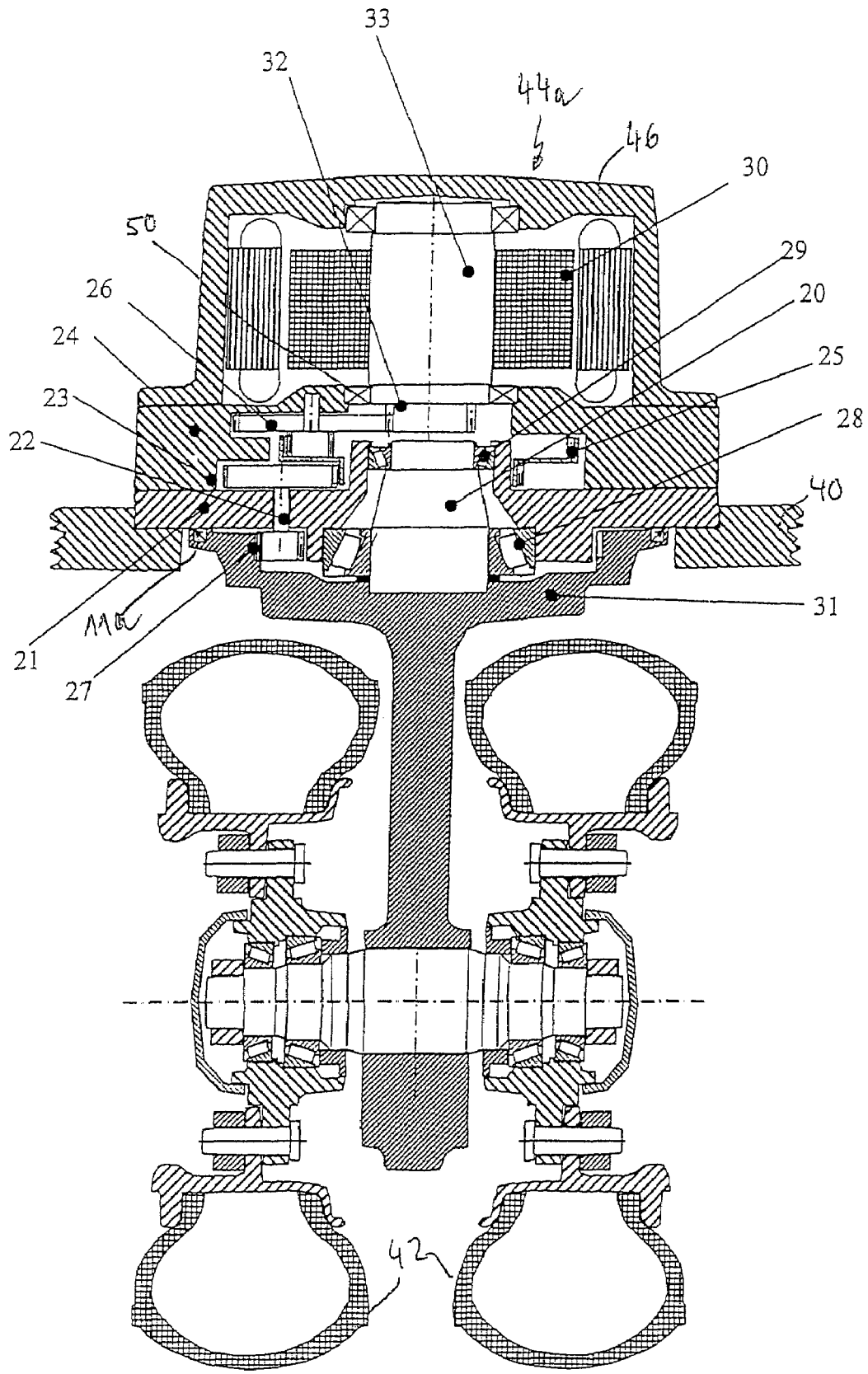
FIG. 2 shows a section through a second embodiment of a steering drive according to the invention which has a two-stage stepped planetary mechanism.

As far as the representation of FIG. 2 uses the same components as the representation of FIG. 1 it is largely provided with the same reference characters. A drive case 44a is constituted by the motor case portion 46, in which a motor 30 is arranged with a motor shaft 33 and transmission case portions 24 and 21, which latter ones are disposed in a disc-like relationship on top of each other. The drive case 44a is fixedly coupled to the flame 40 via the transmission case portion 21, which fact is not shown in detail. A contacting gasket 11 of the steering bolster 31, which shape is relatively similar to that of the steering bolster of FIG. 1, sealingly interacts with the level surface of the transmission case portion 21 facing it in order to guard the drive case 44a from the ingression of dirt and moisture.

The motor shaft 33 has a pinion 32 which interacts with the larger stage of first stepped planet gears 26. The planet gears 26 are mounted by the case portion 24 which, thus, is a planet carrier. The smaller stage of the stepped planet gears 26 is coupled to the larger stage of second stepped planet gears 22 via a connecting shaft 25. The stepped planet gears 22 are mounted by the case portion 21 which, thus, is a planet carrier. The smaller stage of the stepped planet gears 22 is meshes with an internal gear 27 which is formed in the interior of the steering bolster 31. Coaxially connected to the steering bolster 31 is a trunnion 20 which has a portion larger in diameter near the steering bolster 31 and a portion smaller in diameter near the pinion 32. A first antifriction bearing is formed as a tapered roller bearing and is supported by the trunnion 20 in the portion larger in diameter and a second antifriction bearing 29 is supported by the smaller-diameter portion of the trunnion 20 with the two tapered roller bearings 28, 29 being at an axial spacing. The trunnion 20, the motor shaft 33, and the steering bolster 31 are coaxial as is the two-stage stepped planetary mechanism shown. The output of the steering transmission is performed via the internal gear 27.

Figure 3:
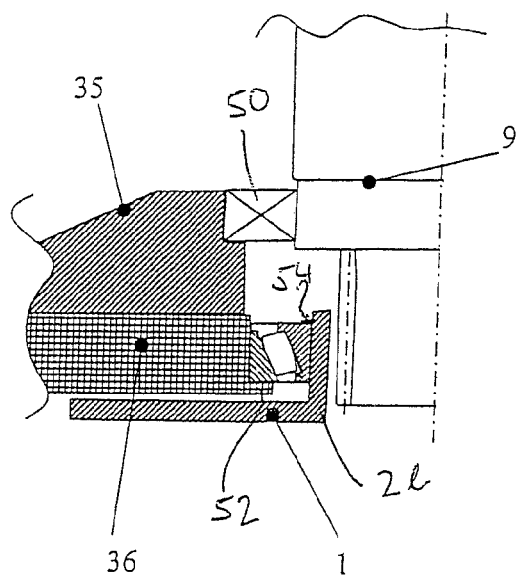
FIG. 3 shows an enlarged view of a modified detail of the representation of FIG. 1.

Referring to FIG. 3, a particularity modified as compared to FIG. 1 is illustrated. The transmission case portion of FIG. 1 is formed by two superimposed portions 35, 36 there, the antifriction bearing 50 being disposed between the motor shaft 9 and case portion 35 while the antifriction bearing 2b is disposed between the case portion 36 and the associated portion of the carrier component 1 or planet carrier. To this end, the case portion 36 has a shoulder 52 on which the outer ring of the tapered roller bearing 2b is supported while a spring washer 54 provides an axial safety device on the plant carrier 1.

Figures 4, 5:
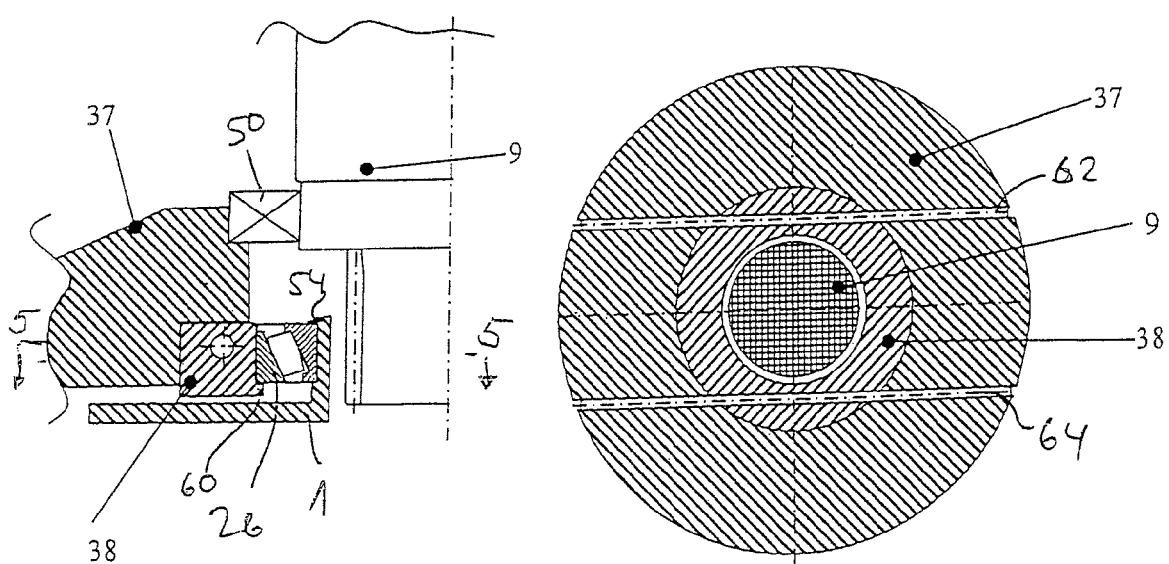
FIG. 4 shows a modified detail of the representation of FIG. 1.
FIG. 5 shows a section through the representation of FIG. 4 along line 5-5.

In another modified embodiment of FIGS. 4 and 5, the case portion 37 which corresponds to the case portion 11 of FIG. 1 has disposed thereon a bearing ring 38 which is seated in a recess of the case portion 37. At this time, the bearing ring assumes the supporting function for the tapered roller bearing 2b, which is taken by the case portion 36 in FIG. 3. Thus, the bearing ring 38 also has a shoulder 60 which axially secures the antifriction bearing 2b.

As can be seen in FIG. 5 the bearing ring 38 is secured by tangentially disposed pins 62, 64. This way allows mounting the bearing ring 38 on the case portion 37 dismounting it therefrom in an easy manner.

Figure 6:
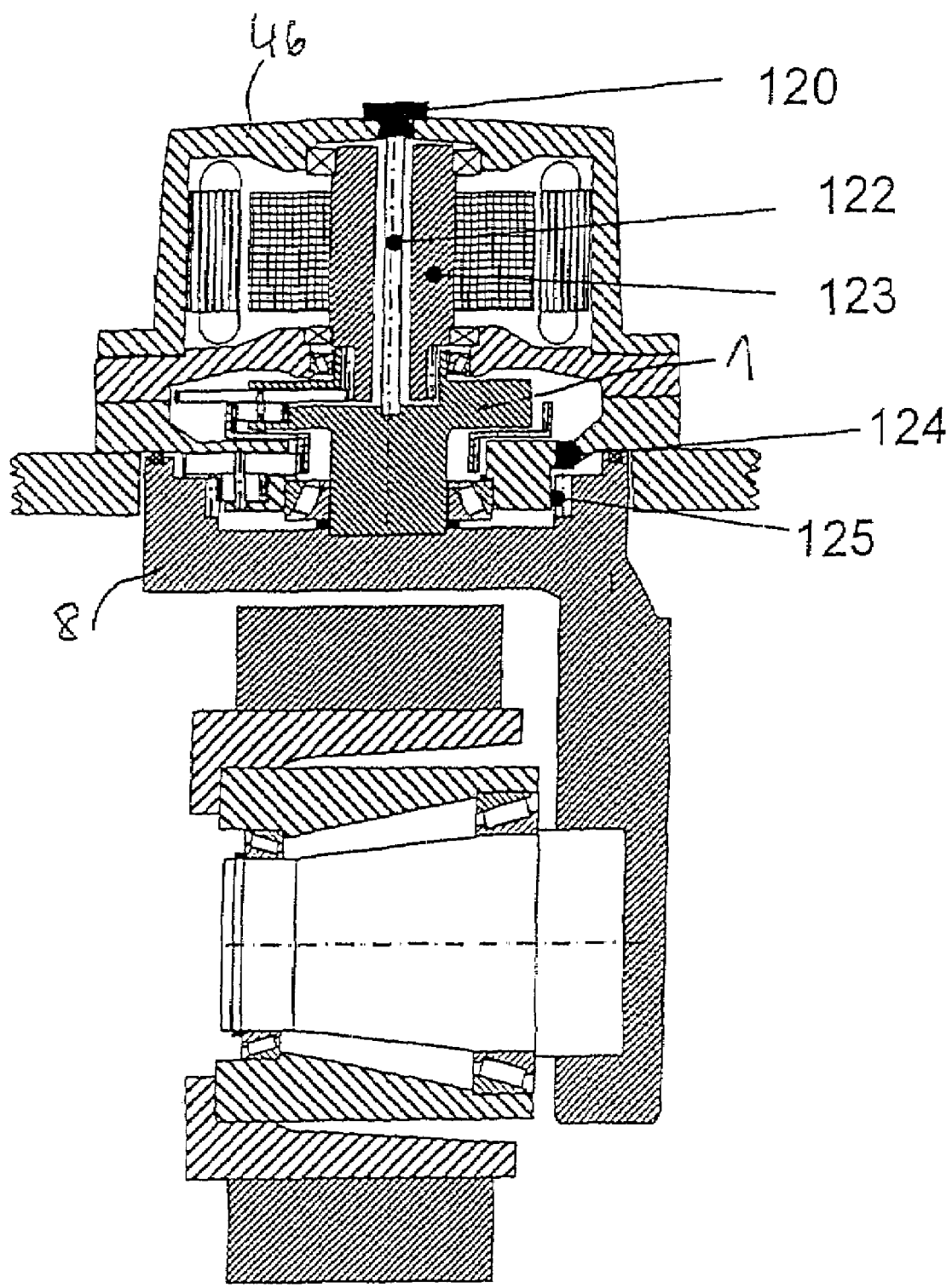
FIG. 6 shows a steering drive having a rotation angle sensor.

In FIG. 6, a steering drive similar to that of FIG. 1, for example, is illustrated where only a single wheel is steered, however. Therefore, particular reference is not made to the structure of the transmission and its interaction with the steering motor. The particularity in FIG. 6 is that a shaft 123 of the steering motor is of a hollow construction and a sensor shaft 122 is passed therethrough. The sensor shaft 122 is firmly coupled to the planet carrier 1 for rotation at its lower end (FIG. 1). At its upper end, the sensor shaft 122 interacts with a rotation angle sensor 120 which is mounted on the case 46 of the steering motor. The steering angle sensor 120 measures the steering angle redundantly with respect to the steering angle detection in the steering motor. A redundant steering angle sensing is also possible via an incremental sensor 124 which traces a contour on a component joined to the steering bolster 8, e.g. a tooth system 125.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A steering drive for a steered wheel of an industrial truck, comprising:
   a steering bolster supporting a rear wheel which is supported to be pivotable about a vertical steering axle inside a frame of the industrial truck;
   a steering motor coaxial with the steering axle;
   a bearing assembly between the frame of the industrial truck and the steering bolster;
   a steering transmission between the steering motor and steering bolster, the steering transmission having a single-stage or multi-stage stepped planetary mechanism or planetary coupler mechanism coaxial with the steering axle and the bearing assembly for the bolster is arranged within the steering transmission, and the bearing assembly further including two axially-spaced antifriction bearings, which are tapered roller bearings.

2. The steering drive according to claim 1, characterized in that the bearing assembly includes an inner race and an outer race, and is supported on a central bearing component (1) coupled to the bolster (8) while the outer race is supported on a transmission case portion (11, 3).

3. The steering drive according to claim 2, characterized in that the bearing assembly further includes two axially-spaced antifriction bearings (2a, 2b), which preferably are tapered roller bearings.

4. The steering drive according to claim 1, characterized in that the bearing component (1) also is a planet pinion carrier and a driven wheel is defined by an internal gear (7) provided on the bolster (8).

5. The steering drive according to claim 3, characterized in that a second planet pinion carrier is defined by a case portion (3) on which the antifriction bearing (2a) located closer to the bolster (8) is supported.

6. The steering drive according to claim 3, characterized in that the planet pinion carriers of the two-stage stepped planetary mechanism is defined by two superimposed separate transmission case portions (24, 21) and both of the antifriction bearings are supported on the transmission case portion located closer to the bolster (31).

7. The steering drive according to claim 4, characterized in that the internal gear (7, 27) is formed integrally with the bolster (8, 31).

8. The steering drive according to claim 1, characterized in that a motor case portion (46) and disc-like transmission case portions (11, 3, 24, 21) stacked on top of each other define a closed drive case (44, 44a) and the bolster (8, 31) has disposed thereon a contacting gasket (11) which sealingly interacts with a sealing surface of the case portion facing it (3, 21).

9. The steering drive according to claim 3, characterized in that a shaft (9, 33) of the steering motor (10, 30) is held in a bearing on the transmission case portion (11) on which the antifriction bearing (2b) located closer to the steering motor (10) is also supported.

10. The steering drive according to claim 9, characterized in that the case portion is formed from two separate disc-like, superimposed transmission case sub-portions (35, 36) each of which houses a bearing (50, 54).

11. The steering drive according to claim 9, characterized in that a bearing ring (38) supporting the antifriction bearing (54) is mounted on the transmission case sub-portion (37).

12. The steering drive according to claim 11, characterized in that the bearing ring (38) is detachably coupled to the transmission case portion (37) by tangentially arranged pins (62, 64).

13. The steering drive according to claim 1, characterized in that the bolster (8) or a transmission component (1) coupled to the bolster (8) has connected thereto a sensor shaft (122) which is passed through a hollow shaft (123) of the steering motor and interacts with a rotation angle sensor (120) at the steering motor side facing away from the steering transmission.

* * * * *